United States Patent [19]

Aso et al.

[11] Patent Number: 4,748,310
[45] Date of Patent: May 31, 1988

[54] WIRE FEED MECHANISM OF WIRE ELECTRIC DISCHARGE MACHINE

[75] Inventors: Toshiyuki Aso, Hino; Tamotsu Ishibashi, Hachioji, both of Japan

[73] Assignee: Fanuc Ltd., Minamitsuru, Japan

[21] Appl. No.: 46,920

[22] PCT Filed: Aug. 13, 1986

[86] PCT No.: PCT/JP86/00414
§ 371 Date: Apr. 8, 1987
§ 102(e) Date: Apr. 8, 1987

[87] PCT Pub. No.: WO87/01064
PCT Pub. Date: Feb. 26, 1987

[30] Foreign Application Priority Data

Aug. 13, 1985 [JP] Japan .................... 60-176883

[51] Int. Cl.[4] .................... B23H 7/10; B65H 59/00
[52] U.S. Cl. .................... 219/69 W; 242/45; 242/75.44; 242/75.51
[58] Field of Search ............. 219/69 W, 69 RS, 69 V, 219/69 G; 242/45, 75.44, 75.5, 75.51, 156; 204/206

[56] References Cited

U.S. PATENT DOCUMENTS

| | | | |
|---|---|---|---|
| 2,761,050 | 8/1956 | Ballhausen | 219/69 G |
| 3,822,374 | 7/1974 | Ullmann et al. | 219/69 W |
| 4,043,517 | 8/1977 | Jahrig | 242/45 |
| 4,412,118 | 10/1983 | Nomura et al. | 219/69 W |
| 4,523,074 | 6/1985 | Okuda | 219/69 W |
| 4,598,189 | 7/1986 | Inoue et al. | 219/69 W |

FOREIGN PATENT DOCUMENTS

| | | | |
|---|---|---|---|
| 52-2838 | 1/1977 | Japan . | |
| 52-40291 | 3/1977 | Japan | 242/45 |
| 57-49336 | 10/1982 | Japan . | |
| 58-202725 | 11/1983 | Japan . | |
| 59-55627 | 4/1984 | Japan . | |
| 533537 | 10/1976 | U.S.S.R. | 242/45 |

Primary Examiner—A. D. Pellinen
Assistant Examiner—Geoffrey S. Evans
Attorney, Agent, or Firm—Staas & Halsey

[57] ABSTRACT

A wire feed mechanism of a wire electric discharge machine, which rewinds a wire electrode (P), that is broken during electric discharge machining, by a wire electrode feed reel (1) to a state convenient for connection of the electrode. The mechanism has a clutch (3) having an output shaft (5) coupled to the wire electrode feed reel and creating a coupling torque between input and output members (3a, 3b) in a manner changing in accordance with a feed voltage, and a geared motor (M) coupled to an input shaft (6) of the clutch. When the wire electrode is broken, the feed reel is coupled to the geared motor, that is stopped, through the clutch which receives a high voltage and the input and output members of which are firmly engaged with each other, to be prevented from idling. The thus stopped feed reel is then driven by the geared motor at a predetermined torque and a low speed through the clutch which is supplied with a decreased voltage and loosely engaged, to rewind the wire electrode.

5 Claims, 1 Drawing Sheet

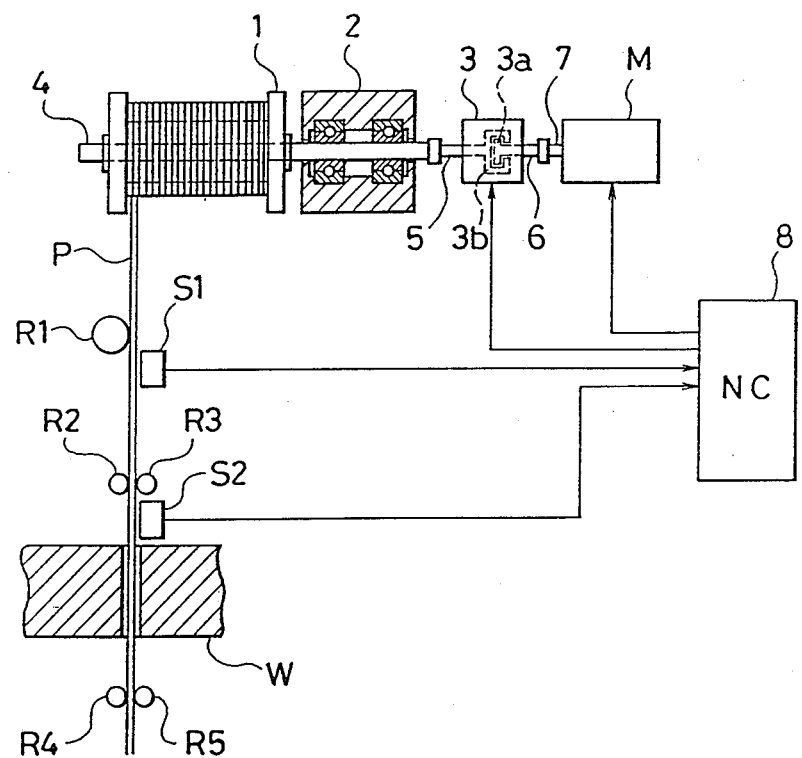

WIRE FEED MECHANISM OF WIRE ELECTRIC DISCHARGE MACHINE

TECHNICAL FIELD

The present invention relates to a wire feed mechanism of a wire electric discharge machine.

BACKGROUND ART

A wire electric discharge machine is arranged to generate electric discharge between a wire electrode and a workpiece while the wire electrode runs under a tension, to perform machining. During electric discharge machining, the wire electrode may be undesirably broken in a workpiece. In this case, the wire electrode must be rewound and connected. Conventionally, wire electrode rewinding is performed by rotatively driving a feed reel while the feed reel is being torque-controlled by an AC motor or the like. However, even when the AC motor is driven with its output torque-controlled, its rotational speed cannot be controlled. Therefore, the feed reel rotates at a high speed and it is idling after the wire electrode rewinding is completed. As a result, a winding state of the wire electrode of the feed reel is degraded. This is inconvenient to connect the wire electrode. Disclosure of Invention It is an object of the present invention to provide a wire feed mechanism of a wire electric discharge machine, which can rewind a wire electrode, that is broken during electric discharge machining, on a feed reel, without disturbing its winding state, and which can provide a rewinding state convenient for subsequent connection of the wire electrode.

In order to achieve the above object, the present invention comprises a clutch having clutch elements one of which is integrally coupled to the wire electrode feed reel and rotatable therewith and arranged to create a coupling torque between the clutch elements that changes in accordance with a feed voltage, and a geared motor coupled to the other clutch element of the clutch. Preferably, the present invention further comprises detecting means for detecting a breakage of the wire electrode and outputting a breakage detection signal, and control means responsive to the breakage detection signal for supplying a first predetermined voltage to firmly engage the clutch, and for supplying a second predetermined voltage to loosely engage the clutch and driving the geared motor after rotation of the feed reel is stopped.

In this manner, according to the present invention, a wire electrode feed reel is driven by a geared motor through a clutch creating a variable coupling torque between clutch elements, i.e., input and output members thereof. Therefore, during electric discharge machining, a feed voltage applied to the clutch is controlled to control the tension of the wire electrode to a predetermined value. Further, when the wire is broken, the rotating feed reel and the stopped motor are coupled through the firmly engaged clutch. As a result, rotation caused by the inertia of the feed reel and so on can be immediately stopped, and the feed reel may not idle to loosen the wire electrode. Furthermore, the wire electrode is rewound by the geared motor through the loosely engaged clutch at a predetermined torque and at a low speed. Therefore, a breakage point can be easily detected, and the electrode can be stopped at a position convenient for subsequently connecting the wire electrode.

BRIEF DESCRIPTION OF DRAWING

A single figure is a schematic diagram of a wire feed mechanism according to an embodiment of the present invention.

BEST MODE OF CARRYING OUT THE INVENTION

The accompanying drawing shows a wire feed mechanism according to an embodiment of the present invention, which is adapted to be incorporated in a wire electric discharge machine. Reference numeral 1 denotes a wire electrode feed reel which is detachably fitted on a rotating shaft 4 supported by a bearing 2 in such a manner that the reel 1 is rotatable in unison with the shaft 4. A wire electrode P for machining a workpiece W is wound on the feed reel 1. Fixed to one end of the rotating shaft 4 is an output shaft 5 of a clutch 3 which is of a type wherein a coupling torque between input and output members 3a and 3b of the clutch 3 changes in accordance with a feed voltage, i.e., an excitation current. Preferably, the clutch 3 is a powder clutch with ferromagnetic particles filled between its input and output members. An input shaft 6 of the powder clutch 3 is fixed to an output shaft 7 of a geared motor M. Reference symbols R1 to R5 denote guide rollers for guiding the wire electrode P. The pair of guide rollers R2 and R3 and another pair of guide rollers R4 and R5 clamp the wire electrode P and hold it to be movable in a predetermined wire feed path. The wire electrode P is disposed to be driven by feed rollers and so on (neither are shown) to travel along the path. Reference symbol S1 denotes a breakage detection sensor which is arranged to detect a flexure of the broken wire electrode P between the feed reel 1 and the guide rollers R2 and R3, thereby detecting breakage of the wire electrode P. Reference numeral S2 denotes a breakage point detection sensor which is arranged to detect the breakage point of the wire electrode P when a breakage end of the wire electrode P passes near it while the broken wire electrode is being rewound by the feed reel. Reference numeral 8 denotes a numerical controller (to be referred to as an NC hereinafter) for controlling the rotation of the geared motor M and the feed voltage to the powder clutch 3 in accordance with signals supplied from the sensors S1 and S2.

The operation of the above wire feed mechanism will now be described.

During electric discharge machining, the NC 8 supplies a predetermined low voltage to a coil (not shown) of the powder clutch 3 and at the same time drives feed rollers and so on (neither are shown) while the geared motor M is stopped. When the wire electrode P is pulled down upon the rotation of the feed rollers, the feed reel 1 rotates together with the rotating shaft 4 and the output shaft 5 of the powder clutch 3 against a predetermined low frictional force generated between the input and output members of the powder clutch 3 to which the low voltage applied, to feed the wire electrode P to an electric discharge machining section. As a result, a predetermined tension is generated by a force of the feed rollers that drive the wire electrode P and by a predetermined low frictional force of the powder clutch 3, these forces exerting in the opposite directions from each other, and the wire electrode P travels under this tension.

When the wire electrode P is broken at the electric discharge section during electric discharge machining, a portion of the wire electrode P on the feed reel 1 side is operatively disconnected from the feed rollers. However, the feed reel 1 and so on continue to rotate by inertia and the wire electrode P flexes at a location between the feed reel 1 and the guide rollers R2 and R3. The breakage detection sensor S1 detects the flexure and generates a breakage detection output signal. Upon reception of the output signal, the NC 8 outputs a high voltage to the powder clutch 3 and firmly engages the input and output members thereof, thereby increasing the frictional force acting therebetween. At that time, the geared motor M is kept stopped, and its output shaft 7 cannot rotate unless it receives a large torque. Therefore, the output shaft 5 of the clutch connected to the shaft 7 through the input shaft 6 of the clutch 3, the rotating shaft 4, and the feed reel 1, all of which have rotated by inertia, are immediately stopped. Then, the wire electrode P clamped by the guide rollers R2 and R3 is stopped as it flexes between the feed reel 1 and the guide rollers R2 and R3. The NC 8 lowers the feed voltage applied to the powder clutch 3, loosely engages the input and output members of the clutch 3, in other words, decreases the frictional resistance of the clutch to a predetermined small value, and thereafter drives the geared motor M. As a result, the output shaft 7 of the geared motor M rotates at a low speed to rotate the rotating shaft 4 and the feed reel 1 through the loosely engaged powder clutch 3, and rewinds the wire electrode P at a predetermined torque corresponding to the low frictional force resistance of the powder clutch 3. When the breakage point detection sensor S2 detects a breakage point of the wire electrode P, the NC 8 stops the geared motor M, and the wire electrode P stops at a position that facilitates a subsequent connecting operation for it while its portion around the breakage point is clamped by the guide rollers R2 and R3.

We claim:

1. A wire feed mechanism having a wire electrode feed reel for use in a wire electric discharge machine, comprising:
   a clutch having a plurality of clutch elements, a first one of which is coupled to said wire electrode feed reel to be integrally rotatable therewith and arranged to create a coupling torque between said plurality of clutch elements that changes in accordance with a feed voltage;
   a geared motor coupled to a second one of the plurality of clutch elements of said clutch, for rewinding said wire electrode;
   detecting means for detecting a breakage of said wire electrode and for outputting a breadkage detection signal; and
   control means responsive to the breakage detection signal for supplying a first predetermined voltage to the clutch to firmly engage said clutch, so as to couple said wire electrode feed reel to said geared motor when the reel is rotating and said geared motor is kept stopped, thereby stopping idle rotation of said wire electrode feed reel upon breakage of said wire electrode, and for supplying a second predetermined voltage to the clutch to loosely engage said clutch so that a predetermined tension is applied to said wire electrode during machining.

2. A wire feed mechanism according to claim 1 characterized in that said clutch comprises a powder clutch.

3. A wire feed mechanism according to claim 1, wherein said control means supplies said second predetermined voltage and drives said geared motor after rotation of said feed reel is stopped.

4. A wire feed mechanism according to claim 3, wherein said detecting means comprises a sensor for detecting a flexure of a broken wire electrode.

5. A wire feed mechanism according to claim 7, wherein said machine comprises second detecting means for detecting a breakage point of the broken wire electrode and outputting a breakage point detection signal, and said control means causes said geared motor to stop in accordance with the breakage point detection signal.

* * * * *

UNITED STATES PATENT AND TRADEMARK OFFICE
CERTIFICATE OF CORRECTION

PATENT NO. : 4,748,310

DATED : May 31, 1988

INVENTOR(S) : Aso et al.

It is certified that error appears in the above-identified patent and that said Letters Patent is hereby corrected as shown below:

Col. 1, line 27, "Disclosure of Invention" should be --DISCLOSURE OF INVENTION--.

Col. 4, line 14, "breadkage" should be --breakage--;
line 36, "7" should be --4--.

Signed and Sealed this

Thirtieth Day of April, 1991

Attest:

HARRY F. MANBECK, JR.

Attesting Officer

Commissioner of Patents and Trademarks